United States Patent [19]
Larson

[11] Patent Number: 5,168,249
[45] Date of Patent: Dec. 1, 1992

[54] MINIATURE MICROWAVE AND MILLIMETER WAVE TUNABLE CIRCUIT

[75] Inventor: Lawrence E. Larson, Santa Monica, Calif.

[73] Assignee: Hughes Aircraft Company, Los Angeles, Calif.

[21] Appl. No.: 712,028

[22] Filed: Jun. 7, 1991

[51] Int. Cl.⁵ .......................... H01P 1/22; H01P 1/10; H01P 1/20

[52] U.S. Cl. .................. 333/81 A; 200/181; 333/262; 333/263

[58] Field of Search ................. 333/101, 105, 33, 161, 333/81 A, 246, 262, 263; 200/181; 310/309

[56] References Cited

U.S. PATENT DOCUMENTS

| | | | |
|---|---|---|---|
| 4,096,453 | 6/1978 | Rogers | 331/117 D |
| 4,472,690 | 9/1984 | Hallford | 333/263 X |
| 4,716,389 | 12/1987 | Gawronski et al. | 333/81 A |
| 4,906,956 | 3/1990 | Kakihana | 333/263 X |
| 4,922,253 | 5/1990 | Nathanson et al. | 342/5 |
| 5,043,043 | 8/1991 | Howe et al. | 310/309 X |

*Primary Examiner*—Paul Gensler
*Attorney, Agent, or Firm*—E. E. Leitereg; W. K. Denson-Low

[57] ABSTRACT

A miniature, electrostatically actuated, dynamically tunable circuit which is operable to tune a transmission line in response to control signals. This circuit is micromachined with the use of integrated circuit processes such that a fixed transmission line is fabricated on a substrate and a movable signal line is fabricated over the substrate and is movable relative to the fixed transmission line in response to electrostatic fields produced when the control signals are selectively applied to an array of air bridge stator control electrodes which span the transmission line.

24 Claims, 2 Drawing Sheets

MINIATURE MICROWAVE AND MILLIMETER WAVE TUNABLE CIRCUIT

BACKGROUND OF THE INVENTION

1. Field Of The Invention

This invention relates generally to tunable circuits and more particularly to miniature dynamically tunable circuits of a type that can be fabricated on integrated circuit substrates.

2. Description Of The Related Art

With integrated circuit technology, size and space are a serious constraint on circuit designers. For example, very small dimensioned, thin film circuit elements are fabricated directly onto the surface of a dielectric substrate. Very often these individual circuit elements have different characteristic impedances than the circuit elements to which they are coupled. Since it has been difficult to utilize variable tuners for impedance matching because of the small dimensions involved and the density of circuit elements, such lines have typically been tuned to a fixed impedance match.

Unfortunately, the circuit element impedances change with normal variations in the processed integrated circuit.

Consequently, the impedance match can be lost. As a result of the fixed nature of the circuit element tuning, the resulting operating flexibility and performance of the overall integrated circuit is undesirably affected.

These challenges have often been met by the use of active semiconductor devices for circuit tuning purposes. The use of active semiconductor devices for such tuning is described by I. Bahl and P. Bhartia in *Microwave Solid-State Circuit Design*, John Wiley & Sons (1988), pages 373 through 422. While these types of devices are characterized by their small sizes, they do present other challenges to the circuit designer. For example, they typically introduce significant losses and have limited ranges and power handling capabilities.

With the advent of micro-machining it has been shown that it is feasible to fabricate miniature mechanical and electro-mechanical devices using thin film integrated circuit technology. Some specific examples are the levers, gears, sliders, and springs referred to in U.S. Pat. No. 4,740,410, issued on Apr. 26, 1988, to R. S. Muller et al., and entitled *Micro Mechanical Elements and Methods for Their Fabrication*. In addition, electromechanical devices such as rotatable motors and linear motors are described in U.S. Pat. No. 4,754,185, issued on Jun. 28, 1988 to K. J. Gabriel et al., and entitled *Micro-Electrostatic Motor*.

SUMMARY OF THE INVENTION

In meeting the challenges mentioned above, the present invention is embodied in a micro-machined, electrostatically actuated, tunable circuit element fabricated on a dielectric substrate of an integrated circuit chip by the use of integrated circuit processing technology. Specifically, a fixed coplanar or microstrip transmission line is fabricated on the surface of the substrate. An array of air bridge stator control electrodes are disposed along the transmission line. In addition, a movable signal line is fabricated on the substrate such that it can be electromechanically moved relative to the fixed transmission line by electrostatic forces generated by the stator control electrodes. The signal line thus affects the impedance of the transmission line and thereby tunes the transmission line and matches it to the associated circuit elements to which it is coupled. Various applications include, for example, tunable length transmission lines, stub tuners, switches, variable attenuators, phase shifters, mixers, etc.

There are numerous advantages to such tunable circuit elements. Among them are that the elements can be batch fabricated on an integrated circuit chip utilizing the same integrated circuit processing techniques that the associated integrated circuits are fabricated with. Thus, at the same time that integrated circuits are being fabricated, dynamically tunable circuit elements can be fabricated that take up very little space on the wafer, add very little weight, and are easily replicated. Moreover, the tunable circuit elements can be positioned closer to the associated circuit elements than would be the case if the tunable circuit elements were positioned off of the wafer, thereby reducing long line effects. In addition, the tunable circuit elements have a wide dynamic range in the microwave and millimeter wave bands and exhibit very little power loss when performing the tuning. Furthermore, the tunable circuit elements can be adjusted electro-mechanically on the wafer with very low power control signals. The stub tuner is also radiation hardened.

The air bridge stator control electrodes have the advantages of a reduced parasitic coupling at high frequencies, reduced starting voltages, and improved cut-off frequencies compared to existing approaches. In addition, the excess capacitance of the signal line to the stator control electrodes can be incorporated into the determination of the characteristic impedance of the transmission line. Thus the position of the signal line does not have significant adverse effects on the loss or attenuation of the transmission line.

By fabricating such tunable circuit elements in place on the integrated circuit it is now possible to tune the circuit after fabrication, thereby giving improved circuit design freedom, enhancing the circuit yield, and lowering the manufacturing costs In addition, the described tunable circuit elements are believed to have a wider dynamic range, lower insertion losses, and greater isolation at microwave and millimeter wave band operation than other known tuners.

DESCRIPTION OF THE PREFERRED EMBODIMENTS

Figure 1:
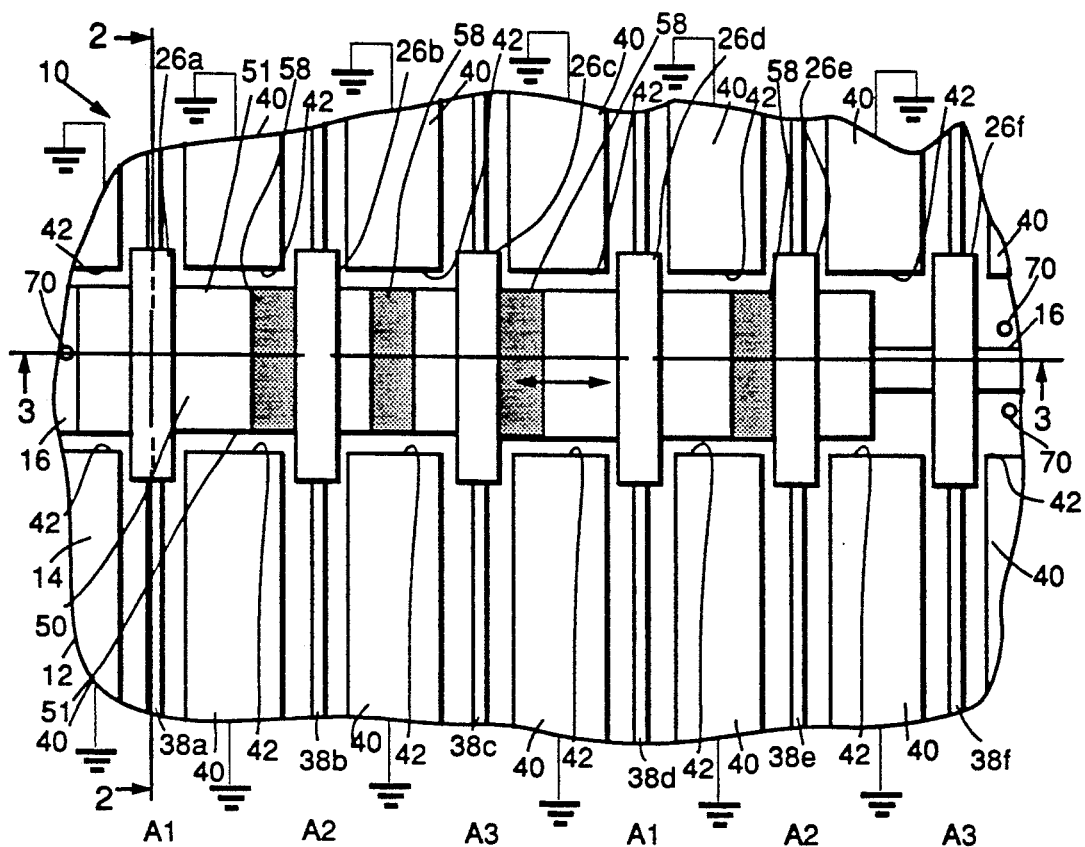
FIG. 1 is a top plan view of a tunable transmission line illustrating a coplanar transmission line and a movable signal line which is operably translated along the long axis of the transmission line by electrostatic forces generated by an array of air bridge stator control electrodes.

Referring now to the drawings in more detail, as illustrated in the top plan view of FIG. 1 a micromachined tunable circuit configured as a tunable transmission line 10 is fabricated on a substrate 12 utilizing, for example, thin film integrated circuit manufacturing techniques such as the photoresist, masking, deposition, metalization, selective etching, and chemical milling techniques described in U.S. patent application Ser. No. 07/608,139, filed on Nov. 1, 1991, now U.S. Pat. No. 5,121,089, by Lawrence E. Larson, and entitled *Micro-Machined Switch & Method Of Fabrication.* Of course, other techniques could also be used to fabricate the circuits.

Hereinafter when the term "thin film" is used it should be understood it means films typically deposited by plating, sputtering, evaporation, or vapor deposition and having a typical thickness, by way of example but not limitation, of less than about 10 microns.

The substrate 12 is made of a dielectric and has a smooth, flat surface 14. Preferably the substrate is made of gallium-arsenide since it is an excellent dielectric for microwave and millimeter wave applications, and semiconductor devices and passive circuit components can be fabricated on it. It is believed that other materials such as, for example, silicon, sapphire, or indium-phosphide would be appropriate.

A transmission line 16 is fabricated at the surface 14 of the substrate using photoresist, masking, selective etching, and thin film metalization processes. Specifically, a channel is first etched in the substrate 12 and then metal is deposited into the channel. This segment of the transmission line 16 is generally linear, has a rectangular cross section and has a flat smooth top surface 18 that is coplanar with the plane of the substrate surface 14, as is best illustrated in FIG. 2.

Hereinafter when the relative descriptive term "top" is used it should be understood that "top" is relative to the top surface 14 of the substrate 12 and faces outward from the plane of a top plan view such as FIG. 1. Structurally, the transmission line 16 includes a first layer 20 of titanium about 500 A (Angstroms) thick and gold about 4500 A thick deposited by evaporation in the channel, as illustrated in FIG. 2. Titanium is used because it bonds very well to gallium arsenide. A layer of gold 22 is plated on top of the layer 20. This gold layer can be about 1 micron thick. The width of the transmission line is, for example, 20 to 40 microns and steps down to a narrower width at the right hand side. Of course in some embodiments the transmission line 16 would have the same width along its entire length.

An array of spaced apart stator control electrodes 26a through 26f are disposed along the transmission line 16 in spaced apart relationship to each other and in spaced electrical isolation from the transmission line. It should be understood that the array of control would extend beyond the control electrode 26f in many embodiments.

Figure 2:
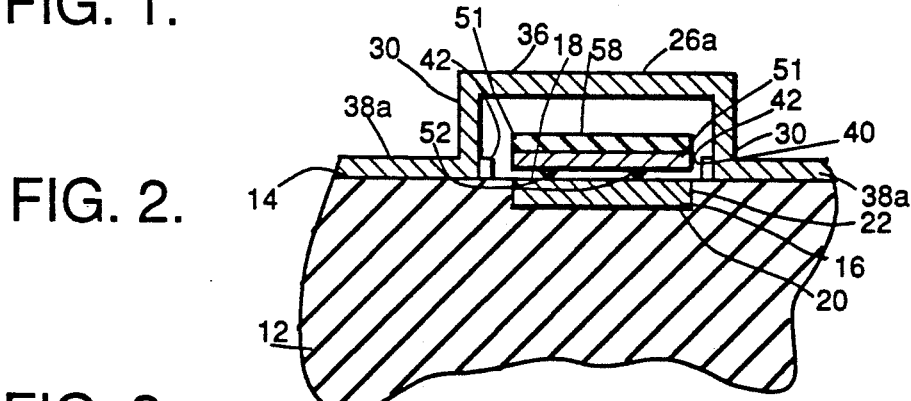
FIG. 2 is an enlarged end elevation, cross-section view of the tunable transmission line of FIG. 1 taken along the plane 2—2, illustrating the relationship between the movable signal line, the transmission line and an air bridge stator control electrode.

As is best illustrated in FIG. 2, each of the control electrodes, such as 26a, is configured as an air bridge that extends over the transmission line 16. Two flanges 30 are fabricated on the substrate surface 14 such that the base of each flange is adhered to the surface 14 at a location spaced apart from the opposite edges of the transmission line 16. Body portions of the flanges 30 project from the substrate 12 in a plane normal to the surface 14 and parallel to the edges of the transmission line 16.

A bridge member 36 is fixed to the upper ends of the flanges 30 and extends over the transmission line 16 a sufficient distance so that an air space is created between the upper surface 18 of transmission line 16 and the lower surface of the bridge member 36.

The control electrodes 26a-26f are fabricated using the previously referenced integrated circuit processing techniques. Generally the bases of flanges 30 include a layer of titanium about 500 A thick and a layer of gold about 4500 A thick. The body portion include a layer of gold about 3 microns high. The bridge member 36 is a layer of gold about 1 micron thick, with a span between flanges 30 of about 100 microns, and a width measured in the direction of the long axis of the transmission line 16 of about 50 microns.

Each control electrode 26a-26f has a control signal lead 38a-38f, respectively, connected to its bases. Each of these control leads is deposited on the substrate surface 14 and extends to a signal pad (not shown) to which a control signal is selectively applied, as will be explained in more detail. The control leads each include a thin layer of titanium 500 A thick, a thin layer of gold about 4500 A thick and a thicker layer of gold about 1 micron thick, and is fabricated using the previously referenced processing techniques.

A ground plane comprised of a plurality of ground plane segments 40 is deposited on the surface 14 in the area between the control leads 38a-38f and spaced from them. One edge 42 of each ground plane segment 40 is located in close proximity to the edges of the transmission line 16 but is spaced from the transmission line. This edge 42 is planar and all of the edges 42 are aligned in one of the two planes parallel to each side of the transmission line 16. Each of the ground plane segments 40 are connected to a reference voltage level signal commonly referred to as ground potential. As with the control leads 38a-38f, the ground plane segments 40 are fabricated from the thin layers of titanium and gold and a thicker layer of gold with the thickness of the segments 40 being about 1 micron.

A movable signal line 50 is positioned on top of the transmission line 16 and is operably moved along the long axis of the transmission line 16 under the influence of electrostatic forces generated by electrostatic control fields of the array of control electrodes 26a through 26f.

The movable signal line 50 is generally elongate and rectilinear and is formed over the substrate surface 14 such that the signal line's long axis is oriented in the direction of the long axis of the transmission line 16. Through the use of photoresists, masking, selective etching and metalization, this signal line 50 is configured so that it is not bonded to the substrate 12 or other elements of the tunable circuit 10 when all of the photo resist is removed but is free to move relative to the fixed transmission line 16.

The signal line 50 is fabricated of the thin layer of titanium and gold and a thicker layer of gold. The signal line 50 is, for example, 1 micron thick, 40 microns wide (preferably the width of the transmission line 16), and 300 microns long.

The side walls 51 of the movable signal line 50 are generally planar and disposed in a plane parallel to the plane of each of the edges 42 of the ground plane segments 40 An air gap of about 5.0 microns, for example, exists between the edges 42 and the side walls 51 of the signal line 50. Electrical field coupling occurs between the side walls of the signal line 50 and the side walls 42 of the ground plane segments 40.

The bottom surface of the signal line 50 closest to the substrate surface 14 has spaced apart node-like bearings 52 formed in it by the previously referred to photoresist and selective etching techniques. These bearings 52 are spaced and configured to ride on the transmission line 16 in low friction sliding relationship. Of course it is possible to eliminate the bearings 52 in certain applications.

A series of dielectric pads 58 are positioned at spaced apart intervals along the top surface of the movable signal line 50. These dielectric pads 58 are generally rectangular and in the embodiments illustrated have a length in the direction of the long axis of the transmission line about equal to the width of the control electrodes 26a–26f. The pads 58 have a dielectric constant greater than ambient air. One material that is effective is a 0.2 micron thick layer of silicon dioxide ($SiO_2$) deposited on the surface of the movable signal line using the referenced thin film processes. There is an air gap of between 1.0 and 2.0 microns between the top surface of the dielectric pads 58 and the bottom surface of the bridge member 36.

The spacing of each pad 58 is such that at least two of the pads are located under two of the control electrodes 26a–26f at any time. This retains the movable signal line 50 on top of the transmission line 16 during linear translation of the signal line 50. A spacing between centers of the adjacent pads 58 in the illustrated embodiments is $\frac{3}{4}$ of the corresponding spacing between centers of the adjacent control electrodes 26a–26f. Of course other spacings may also be practical.

In order to limit the amount of linear travel along the axis of movement of the signal line 50, pillar-like stop members 70 are fabricated of metal on the dielectric surface 14 and the transmission line 16 at locations corresponding to the limits of travel. As a result, when the signal line 50 travels to its limits it is stopped by the stops 70 and travel is thus limited.

In operation, control signals A1, A2 and A3 are sequentially applied to the stator control electrodes 26a–26f. In practice, the control signals A will have a higher or lower voltage potential than ground potential. These control signals set up an electrostatic field at each of the control electrodes which develop an electrostatic image charge on the portion of the signal line 50 under the dielectric pads 58 of opposite polarities relative to the dielectric charge on the control electrode above the pad 58. The electrostatic attraction between the fields of the control electrodes and the charges on the signal line 50 effectively translate the signal line 50 along the axis of the transmission line 16. To move the signal line 50 from left to right relative to the drawing or away from the signal input end of the transmission line 16, the sequence of control signal pairs will be A1, A2, A3, A1, A2, etc.

Figure 3:
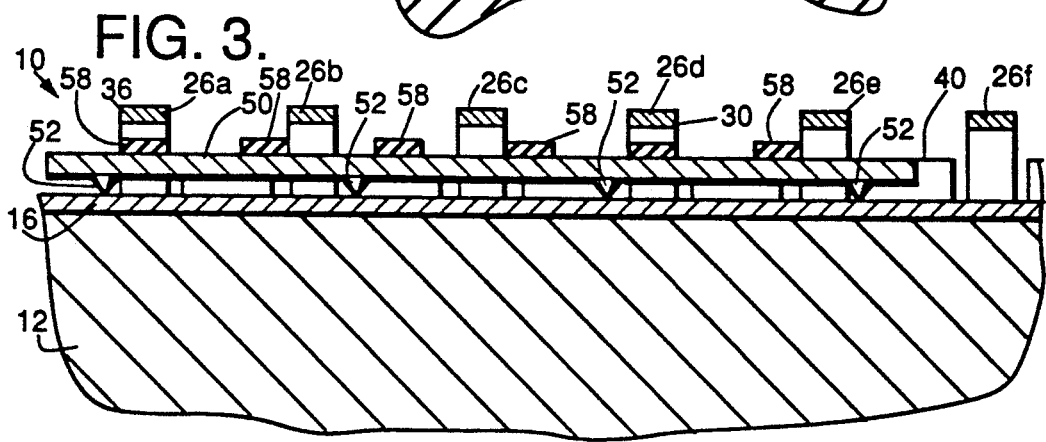
FIG. 3 is a side elevation view of the tunable transmission line of FIG. 1 taken along the plane 3—3 and illustrating the relationship between the movable signal line that is translated along the long axis of the fixed transmission line to operably lengthen and shorten the transmission line and thus tune the transmission line.

When, for example, the signal line 50 is in the position illustrated in FIGS. 1 and 3, a control signal sequence A1, A2, A3 applied to the control electrodes will effectively step the signal line 50 to the right. If, however, the signal line 50 is to be stepped from the far right to the left, the sequence of control signals applied to the stator control electrodes 26a–26f will be reversed to A3, A2, A1, A3. As a result of the electrostatic fields and attractions, the signal line 50 translates from right to left to stop in the position illustrated in FIG. 1.

Finer tuning of the stub 50 can also be accomplished in a number of ways. For example, the signal line 50 can be translated to a position midway between adjacent control electrodes. This is done by simultaneously applying two control signals pairs such as A2 to electrode 26b, and control signal A3 to electrode 26c. The equilibrium point for the electrostatic attraction between the control electrodes and the image changes on the signal line 50 is thus between the adjacent control electrodes. Consequently the signal line 50 comes to rest midway between such adjacent control electrodes.

Even finer tuning of the signal line 50 can be performed by selectively applying control signals such as A2 and A3 of different amplitudes to adjacent pairs of the control electrodes. As a result, the equilibrium point of the electrostatic field will be positioned nearer to one of the adjacent control electrodes than the other one. For example, if the control signal A3 has a higher amplitude than the control signal A2, the equilibrium point will be closer to the control electrodes to which the higher amplitude control signal A3 is applied.

As the signal line 50 is thus translated and repositioned along the axis of the transmission line 16, the characteristic impedance and effective length of the transmission line is tuned to more closely match the impedances of the circuitry to which the transmission line 16 is coupled.

Other tunable miniature microwave circuits which embody features described above can be fabricated. In the following embodiments the reference characters for features that are equivalent to features in the embodiment of FIGS. 1–3 are given the same reference characters. Thus a more detailed understanding of the operation of the features can be obtained by referring back to the corresponding description.

Figure 4:
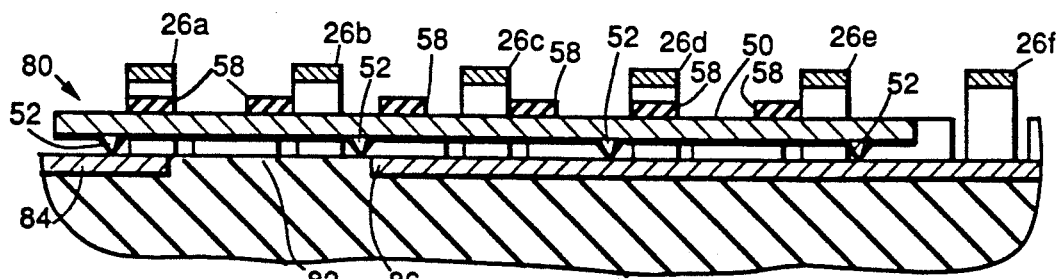
FIG. 4 is a side elevation, cross-section view illustrating a switch embodiment including a movable signal line, a fixed transmission line, and an array of air bridge stator control electrodes.

Specifically, a microwave switch 80 is illustrated in FIG. 4. In this embodiment a segment 82 of the channel that receives the transmission line 16 is not etched out of the substrate 12. As a result there is about a 50 micron gap in the transmission line 16 that is now occupied by a segment of dielectric material of the substrate 12. This segment 82 thus provides electrical isolation between an input section 84 and an output section 86 of the transmission line 16.

As with the embodiment of FIG. 1 through 3, control signals A1, A2, A3, selectively applied to the control electrodes 26a through 26f, translate the signal line 50, which now acts as a switch blade, along the axis of the transmission line sections 82 and 84 to open and close the circuit of switch 80. In the closed circuit position the signal line 50 spans the entire width of the dielectric segment 82 and electrically contacts both the input section 84 of the transmission line and the output section 86. This thus closes the switch circuit by allowing a transmitted signal to be conducted from the input section 84, through the signal line 50, to the output section 86.

Figure 5:
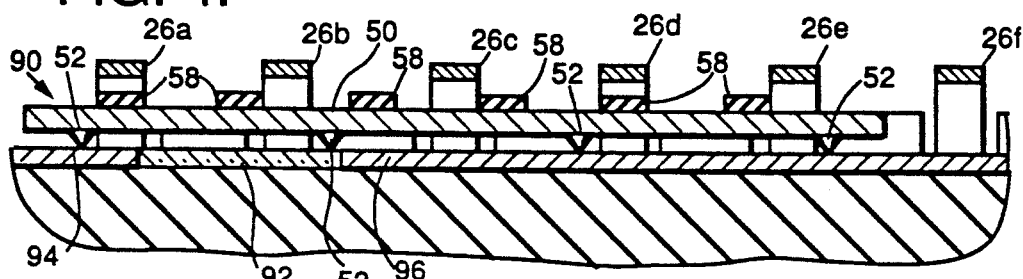
FIG. 5 is a side elevation, cross-section view of a variable attenuator illustrating the relationship between a movable signal line, a fixed transmission line, a resistor, and an array of stator control electrodes that operably translate the movable signal line along the fixed transmission line.

In FIG. 5, a variable attenuator 90 is illustrated in which a segment of the channel that receives the fixed transmission line 16 is filled with a layer of electrical attenuator or resistor material 92. This resistor 92 is a layer of nickel and chrome or tantalum 1.0 microns thick and 50 microns wide sputtered into the channel. The top surface of the resistor material 92 is smooth and coplanar with the substrate surface 14.

The movable signal line 50, which now operates as a wiper arm on pick-off for the variable attenuator 90, is operably translated along the axis of the transmission line input section 94 and output section 96. As control signals A1, A2, A3, etc. are selectively applied to the control electrodes 26a–26f, the movable signal line 50 is stepped across the resistor segment 92. The shorter the distance that the end of the signal line 50 extends across the resistor 92, the greater will be the resistance and the more the transmitted signal will be attenuated before it is picked up by the movable signal line 50. Conversely, the more the signal line 50 extends across the resistor 92, the lower the resistance will be and the less the transmitted signal will be attenuated. For example, when the signal line 50 is in the position illustrated in FIG. 5, the resistance will essentially be at 0 ohms.

Figure 6:
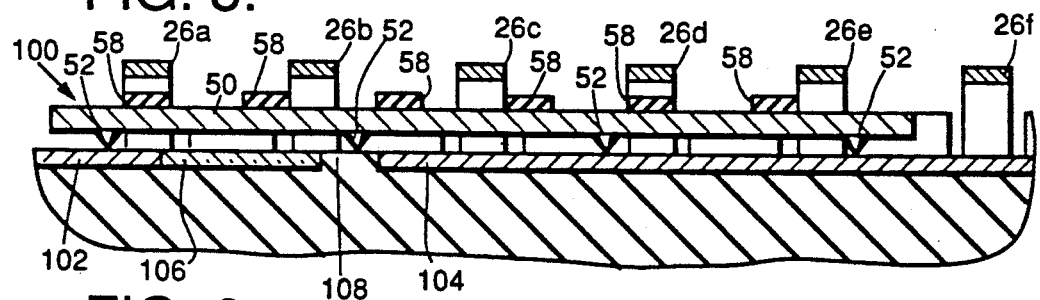
FIG. 6 is a side elevation cross-section view of a variable attenuator and switch illustrating the relationship between a movable signal line, a fixed transmission line, a resistor, and an array of stator control electrodes.

As illustrated in FIG. 6, a combination switch and variable resistor 100 is fabricated using the above referenced processes. In this embodiment a gap between the transmission line input section 102 and an output section 104 is partially filled with the resistor material 106 and partially filled with a segment 108 of the dielectric of the substrate 12.

As with the preceding embodiments, control signals A1, A2, A3 selectively applied to the control electrodes 26a–26f move the signal line 50 across the gap between the input and output sections 102 and 104. This varies the resistance of the circuit 100 and attenuates the transmitted signal when the end of the signal line is positioned over the resistor material 106. However, when the signal line 50 is translated to the right, past the dielectric segment 108, the circuit path is opened and the transmitted signal is no longer conducted through the signal line 50 to the output section 104.

Figure 7:
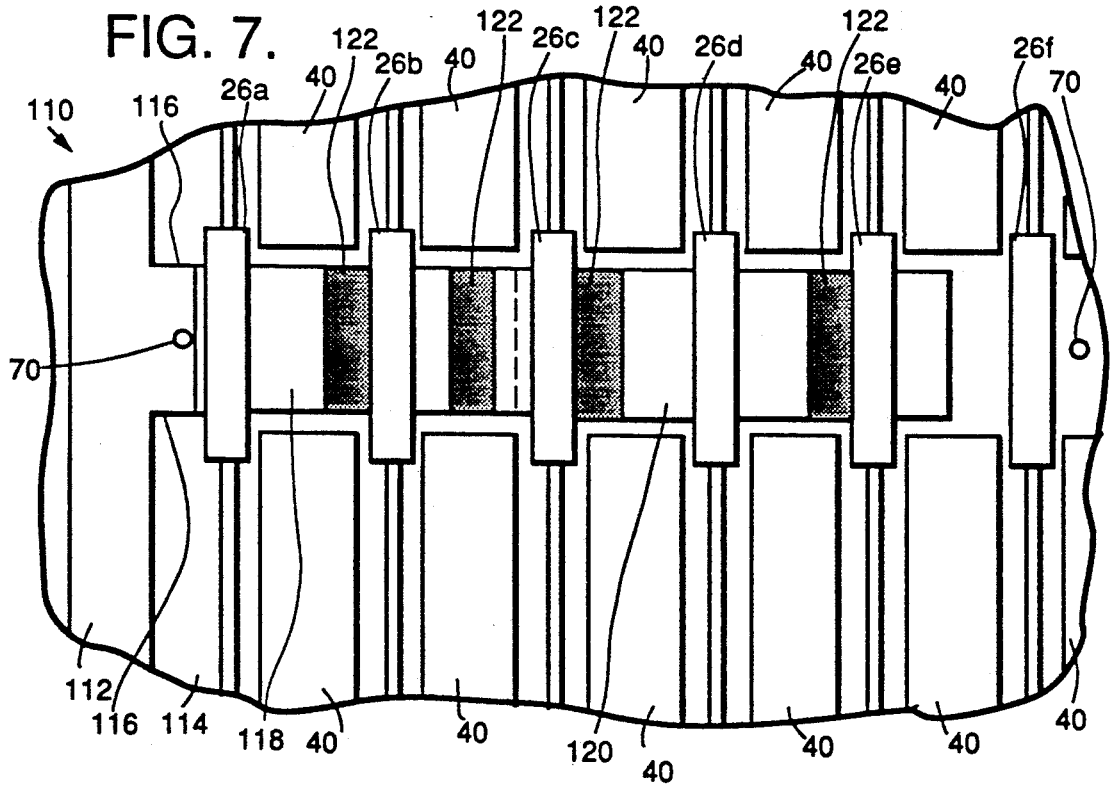
FIG. 7 is a top plan view of a stub tuner having a movable stub which operably translates laterally relative to the long axis of a transmission line to effectively vary the stub length and thus tune the transmission line.

A stub tuner 110 such as the embodiment illustrated in FIG. 7 can be fabricated that incorporates features described herein. Specifically, a coplanar transmission line 112 is formed in a substrate 114 such that the top surface of the transmission line 112 and the substrate surface are coplanar. In addition, a fixed stub 116 is deposited in the substrate such that its top surface is coplanar with the substrate surface. This fixed stub is connected to the transmission line 112 and extends at a right angle to the long axis of the transmission line 112.

A movable signal line, which operates as a movable tuning stub 118, is fabricated over the substrate 114. This movable tuning stub, which is rectilinear, also has its long axis oriented at a right angle to the axis of the transmission line 112 and is positioned in part over the fixed stub 116. The bottom surface of the movable stub 118 is smooth and rides along the smooth top surface of the fixed stub 116 along an axis of movement that is at a right angle to the axis of the transmission line 112. Together the fixed stub 116 and the movable stub 118 form a variable length tuning stub 120.

A series of spaced apart dielectric pads 122, similar to the pads 58 of FIG. 1, are deposited on the top surface of the movable tuning stub 118 and operate in the same manner as these dielectric pads in the preceding embodiments.

As with the previous embodiments, when control signals A1, A2, A3 are selectively applied to the stator control electrodes 26a through 26f, the movable tuning stub 118 is translated linearly along its axis of movement. This repositioning of the movable stub 118 effectively lengthens and shortens the combined length of the tuning stubs. As a result, the characteristic impedance and effective length of the transmission line 112 is tuned to more closely match the impedances of the circuitry to which it is coupled.

While a number of embodiments of tunable circuit elements have been described, it is possible to utilize the air bridge stator control electrodes in a broad range of other applications. Thus it is possible to take advantage of its reduced parasitic coupling at high frequencies, reduced starting voltages, and improved cutoff frequencies compared to existing approaches.

As previously stated, all of the embodiments described herein are fabricated by integrated circuit processes using the same described materials. For example, each of the transmission lines, the tunable stubs, and the stator control electrodes are preferably fabricated of electrically conductive materials such as a thin layer of titanium and gold and thicker layers of gold, each patterned on the substrate using layers of photoresist patterned by masking, photoexposure, selective etching, and metalization.

Moreover, while gold is the preferred material for the structural elements it believed that other electrically conductive materials can be used. Accordingly it should, by way of example but not limitation, be possible to use stainless steel, doped silicon, and rhodium. Moreover, it should again be possible to use materials other than gallium arsenide for the substrate.

While salient features have been described with respect to particular embodiments, many variations and modifications can be made without departing from the scope of the invention. Accordingly, that scope is intended to be limited only by the scope of the appended claims.

What is claimed is:

1. A miniature, electrostatically actuated circuit comprising:
    a substrate;
    first circuit means fixed thereto;
    second circuit means disposed over a first portion of said first circuit means and being movable relative to said first circuit means; and
    control means including control electrodes having at least one air bridge member disposed to span across opposite edges of said first and said second circuit means with an air gap therebetween, said control means being operable to effect electrostatic field attraction between said control electrodes and said second circuit means in response to control signals to move said second circuit means through the air gap and along said first portion of said first circuit means.

2. The miniature, electrostatically actuated circuit of claim 1 in which said first portion of said first circuit means is a transmission line.

3. The miniature, electrostatically actuated circuit of claim 1 in which said second circuit means includes at least one dielectric member disposed thereon at a location that operably moves under said at least one air bridge member, said at least one dielectric member being operable to effect an image charge on said second circuit means in response to electrostatic field attraction of said air bridge member.

4. The miniature, electrostatically actuated circuit of claim 2 in which said first circuit means include a ground plane means disposed adjacent to said first portion of said first circuit means, said ground plane means being operable to be coupled to said first circuit means by an electrical field therebetween.

5. The miniature, electrostatically actuated circuit of claim 1 in which a surface of said first portion of said first circuit means is coplanar with a top surface of said substrate.

6. The miniature, electrostatically actuated circuit of claim 4 in which said ground plane means and said second circuit means are coplanar.

7. The miniature, electrostatically actuated circuit of claim 2 in which said transmission line includes an input section and an output section separated from each other by a dielectric means, said second circuit means being operable to slide into and out of contact with said dielectric means to operably switch open and closed an electrical circuit path between said input and output sections.

8. The miniature, electrostatically actuated circuit of claim 2 in which said transmission line includes an input section and an output section separated from each other by an electrical resistor means, said second circuit means being operable to slide across said electrical resistor means to vary the resistance of an electrical circuit path that includes said input section, said electrical resistor means, said second circuit means, and said output section and variably attenuate signals transmitted along the circuit path.

9. The miniature, electrostatically actuated circuit of claim 2 in which said transmission line includes an input section and an output section separated from each other by an electrical resistor means and a dielectric means, said second circuit means being operable to slide across said electrical resistor means and said dielectric means to vary the impedance of and open and close a circuit path that includes said input section, said electrical resistor means and said second circuit means.

10. The miniature, electrostatically actuated circuit of claim 1 in which said first circuit means includes a transmission line and said first portion of said first circuit means includes a tuning stub fixed to said transmission line, and said second circuit means is operable to vary the effective length of said tuning stub as it moves on said first portion.

11. The miniature, electrostatically actuated circuit of claim 1 in which said control means includes a plurality of spaced apart air bridge members disposed along said first circuit means, said air bridge members being responsive to control signals applied thereto to operably move said second circuit means by electrostatic field forces.

12. The miniature, electrostatically actuated circuit of claim 3 in which said at least one dielectric member includes a plurality of spaced apart dielectric members disposed thereon.

13. The miniature, electrostatically actuated circuit of claim 12 in which said at least one air bridge member includes a plurality of spaced apart air bridge members and each of said dielectric members is spaced apart a distance different than the distance between said air bridge members such that at least two of said dielectric members are located under at least two of said air bridge members during movement of said second circuit means.

14. The miniature, electrostatically actuated circuit of claim 13 in which said dielectric members are spaced on centers of ¾ of the spacing on centers of said air bridge members.

15. The miniature, electrostatically actuated circuit of claim 13 in which said dielectric members and said air bridge members have about the same width dimension measured in the direction of movement of said second circuit means.

16. The miniature, electrostatically actuated circuit of claim 1 in which said air bridge members include upright members fixed at one end to said substrate adjacent to said first portion of said first circuit means, and a span member fixed to a free end of said upright member and being disposed to span across said first portion.

17. The miniature, electrostatically actuated circuit of claim 4 in which said control means includes control signal leads disposed on the substrate and connected to said air bridge members, and said ground plane means includes a plurality of segments each disposed between said control leads and said air bridge members in electrical isolation therefrom.

18. The miniature, electrostatically actuated circuit of claim 1 in which said substrate is a dielectric from the class consisting of gallium arsenide, indium, phosphide, and sapphire.

19. The miniature, electrostatically actuated circuit of claim 1 in which said first circuit means, said second circuit means, and said control means are fabricated of thin films of electrically conductive material.

20. The miniature, electrostatically actuated circuit of claim 19 in which said thin films are less than about 5 microns thick.

21. The miniature, electrostatically actuated circuit of claim 19 in which said second circuit means is comprised of thin film layers less than about 2 microns thick.

22. The miniature, electrostatically actuated circuit of claim 2 in which said transmission line has a first length of a first width and a second length of a second width, the second width being narrower than that of the first width.

23. The miniature, electrostatically actuated circuit of claim 1 in which said second circuit means includes bearing means disposed thereon to maintain said second circuit means spaced from said first circuit means.

24. The miniature, electrostatically actuated circuit of claim 1 in which said first circuit means, said second circuit means and said control means are micromachined of thin films.

* * * * *